3,082,077
SPHALERITE FOR ZINC ADDITIONS TO FERTILIZERS

Walter H. MacIntire, St. Petersburg, Fla., assignor to American Zinc, Lead and Smelting Company, St. Louis, Mo., a corporation of Maine
No Drawing. Filed Apr. 28, 1960, Ser. No. 25,245
2 Claims. (Cl. 71—64)

Zinc is known to be an element essential to perfect plant nutrition. A paucity of this element in the soil induces nutritional disturbances in vegetation, as evidenced by symptoms, such as "rosette," "mottle leaf" and "white bud" in particular plants.

The need for nutritive zinc was reported first by Sumner and Lipman of California in 1926.

The efficacy of zinc sulfate to provide nutritional zinc to soil and vegetation was demonstrated most convincingly through a series of publications from the Agricultural Experiment Station of the University of Flordia. Those reports dealt severally with the use of zinc sulfate for spraying upon vegetation; for additions to soils; as to chemical reactions and fixations that ensue from the sulfate additions in various soils; cases of zinc-induced toxicity; and analytical procedures.

More recent findings of the Tennessee Experiment Station explain the geochemical causes for zinc deficiencies in certain rock-derived soils. The rôle of the element in soil fertility was proved. It is known that heavy rate incorporations of limestone are repressive to the availability of additive soluble zinc sulfate.

Recognition of agronomic benefit from additions of zinc sulfate to soils has been reflected by consumer demand for inclusions of soluble zinc in mixed fertilizers. However, such inclusions must be regulated quantitatively for particular soils and crops, so that resultant concentrations of soluble zinc salts in the soil do not become high enough to be harmful to vegetation.

The possibility of harmful effect from accidental occurrences of zinc in a soil system was known before the beneficial effect of rational-rate incorporations of the element had been demonstrated. Zinc-induced toxicity to vegetation grown outdoors in soils enclosed by galvanized iron "rims" was known.

It has been demonstrated that additions of zinc sulfate to mixed fertilizers cause detrimental caking. Caking is known to result, also, from additions of zinc sulfate to "slurries" of mixed fertilizers. Inclusions of other soluble zinc salts are known to cause mixed fertilizers to undergo caking.

Because of the objectional physical effects of soluble zinc salts upon mixed fertilizer, it seemed desirable to determine possibilities of a relatively insoluble zinc carrier, one that would remain inert while in the fertilizer, yet would become a source of soluble zinc nutrients in the soil. Such a zinc carrier should be a readily obtainable, economical material.

Most unexpectedly, I have found that sphalerite meets these requirements. Large tonnages of it are produced as "fines" through the flotation processing of the ground mother dolomite of the Knox Formation, and similar deposits.

The zinc sulfide mineral, in range of 10–60 mesh, is preferred for use in the present concept. However, the particle size of the flotation sphalerite, and rates of its incorporation, are governed by the fertilizers to which it is to be added; by soils; and by crops. The data of Table I illustrate particle sizes of flotation concentrates, their zinc content, and optional rates for inclusions are indicated in Table II.

Table I

SPHALERITE OBTAINED THROUGH FLOTATION FROM DOLOMITE

| From cyclone spigot [a] | | | From cyclone overflow [b] | | |
|---|---|---|---|---|---|
| Screen | Percent | Assay [c] | Screen | Percent | Assay [c] |
| +35 | 0.6 | | | | |
| [d] +65 | 21.0 | 57.8 | +65 | 3.2 | 61.6 |
| +100 | 20.0 | 60.8 | +100 | 3.6 | 58.6 |
| +150 | 18.1 | 62.3 | +150 | 5.6 | 63.2 |
| +200 | 13.1 | 63.4 | +200 | 6.4 | 63.8 |
| −200 | 27.2 | 63.7 | −200 | 81.2 | 63.6 |

[a] Low content of copper.
[b] High content of copper.
[c] Percent zinc, against 67.12 percent Zn in ZnS.
[d] Used in obtaining data of Tables III and IV.

Table II

RATES FOR ZINC INCLUSIONS: POUNDS PER TON OF MIXED FERTILIZERS

| Percent | As Zn | As ZnO | As sphalerite |
|---|---|---|---|
| 2 | 40 | 49.8 | 60 |
| 3 | 60 | 74.7 | 90 |
| 4 | 80 | 99.6 | 120 |
| 5 | 100 | 124.5 | 150 |
| 6 | 120 | 149.4 | 280 |
| 8 | 160 | 199.2 | 240 |

The oxidative development of zinc sulfate from additive sphalerite in the soil is to be expected, because it is well known that metallic sulfides undergo oxidation in moist atmospheres that prevail in soils. An important factor in the present invention is whether sphalerite inclusions are admissible for acidic mixed fertilizers, in which monocalcium phosphate might undergo hydrolysis and produce orthophosphoric acid, according to the equation $CaH_4(PO_4)_2 + H_2O \rightarrow H_3PO_4 + CaHPO_4 + H_2O$. Obviously, in absence of "free acidity" in preammoniated fertilizers, the inclusions of the inherently inert sphalerite would remain unchanged until the carrying-fertilizer reaches the soil.

Another consideration was whether the hydrolytically-engendered "weak" orthophosphoric acid might liberate noxious hydrogen-sulfide from the sphalerite inclusions, according to the equation: $ZnS + H_3PO_4 \rightarrow H_2S + ZnHPO_4$.

A series of high concentrations of orthophosphoric acid were found to be inert at normal temperatures to "fines" of sphalerite; and high dilutions of that acid also proved inert to sphalerite even when boiled, as shown in Table III.

Table III
INERTIA OF SPHALERITE IN CONTACT WITH SIX DILUTIONS OF 85 PERCENT ORTHOPHOSPHORIC ACID [a]

| System Number | Water Additions to 1 ml. of acid | Nasal After 30 min.[b] | Tests for $H_2S$ After 60 min.[c] | Lead Acetate Paper When Boiled [d] |
|---|---|---|---|---|
| 1 | 500 | None | Negative | Negative. |
| 2 | 250 | ----do---- | ----do---- | Do. |
| 3 | 100 | ----do---- | ----do---- | Do. |
| 4 | 7 | ----do---- | ----do---- | Do. |
| 5 | 3 | ----do---- | ----do---- | Positive. |
| 6 | 1 | ----do---- | Positive | Do. |
| 7 | Leachate of superphosphate.[e] | Negative | Negative | Negative. |

[a] 50-gm. charges of 65-mesh sphalerite per 100 ml. of each dilution.
[b] Nasal test after 30 and 60 minutes were at 30° C.
[c] Each beaker then was covered with a lead acetate-impregnated 125 mm. filter paper, S & S 589.
[d] Subsequent to the two 30-minute contacts of footnotes b and c.
[e] A 50-gm. charge of an 18 percent superphosphate was leached with 100 ml. of water and a 50-gm. charge of 65-mesh sphalerite was introduced into the leachate and the mixture then was stirred 45 minutes continuously and tested as in footnotes b, c and d.

In the first six systems of Table III, fifty-gram charges of the 65-mesh sphalerite of Table I, were placed in beakers and covered with 100 ml. of $H_3PO_4$ in the dilution range 1 to 2 and up to 1 to 500, at 30° C. After 30 minutes, none of the systems emitted nasally-detectable odor of $H_2S$.

The six beakers then were covered with lead acetate-impregnated filter papers (125 M.M.S. and S. 589) and, 30 minutes later, there was no indication of $H_2S$ in five of the 6 filter papers. A faint indication of that gas appeared on the paper that covered the 1 to 2 dilution (1+1) system, which contained 42½ percent of $H_3PO_4$.

After the six beakers had been kept at 30° C. for two successive intervals of 30 minutes, their contents were boiled and tested for emissions of $H_2S$, by means of lead-acetate paper. The four higher-dilution systems gave negative tests, whereas the 1 to 2 (1+1) and 1 to 4 (1+3) dilutions gave faint positive vapor tests to lead acetate. Obviously, those two high concentrations would not occur in mixed fertilizers.

In an additional test, a 50-gram charge of an 18.8 percent superphosphate was stirred with 100 ml. of distilled water 45 minutes continuously and leached immediately. A 50-gm. charge of 65-mesh spaherite was introduced into the acidic leachate, which had a $P_2O_5$ content of 8.5 percent of the superphosphate charge, and the mixture was stirred 45 minutes, at 30° C. It then gave negative nasal and lead acetate paper tests for $H_2S$, and it did likewise when boiled.

Thus the relatively meager concentrations of $H_3PO_4$ that might develop from the monocalcium phosphate content of superphosphate under abnormal humidity is so negligible that it would have no effect upon sphalerite inclusions.

Included sphalerite is therefore so inert that it would not cause a chemical reaction while in the fertilizers, in particular, it does not cause the caking that results from inclusions of soluble zinc salts.

The inertness of sphalerite additions to mixed fertilizers, subsequent to 17-day and 35-day storage in 50-pound lots, in sealed paper bags is shown in the following table:

Table IV
6-6-6 MIXTURE

| Additions, Percent | Nasal Test for $H_2S$ | Condition of Mixture |
|---|---|---|
| None | Negative | Good. |
| 3 | ----do---- | Do. |
| 5 | ----do---- | Do. |
| 12-6-6 MIXTURE | | |
| None | Negative | Good. |
| 3 | ----do---- | Do. |
| 5 | ----do---- | Do. |

The objective of the present invention therefore is to provide a new and novel process and a fertilizer additive for fortifying any suitable fertilizer with zinc through the addition of ground mineral sphalerite without causing objectionable caking of the fertilizer.

Experiments at the Tennessee Agricultural Experiment Station showed that rainwater leachings registered large and unexpected increases in sulfate outgo from the natural sphalerite content of incorporated dolomite. These increases, amounting to 701 pounds, 2804 pounds and 8763 pounds of $SO_3$ from dolomite incorporation at three rates per 2,000,000 pounds of soil, were "assumed to be of both chemical and biochemical nature." The conversion factor for $SO_3$—$ZnSO_4$ is 2.015. In each case, the larger fraction of the enhanced outgo of sulfates occurred in the early part of the experiments.

In another instance, single inputs of sulfur as pyrites and elemental sulfur, were tested against a control of ferrous sulfate, at rate of 1000 pounds of S per acre, with and without supplements of CaO and MgO, each at light and heavy rates. When measured by the sulfate content of the rainwater leachings caused by 256 inches of rainfall, the net increases in sulfate outgo from the sulfur carriers in the 1-foot depth of uninoculated acidic loam registered pyrite oxidation in amounts of 709 pounds, or 70.9 percent of the sulfur input against 759 pounds, or 75.9 percent recovery from the ferrous sulfate control. Sulfate leachings were greatest during the early years of the experiment.

Hence, from the increases in sulfate outgo from the naturally occurring sphalerite contents of the three dolomite incorporations and from the increases in sulfate leachings from the direct additions of the analogous mineral sulfide, pyrites, it is demonstrated that sphalerite inclusions in mixed fertilizers will provide adequate quantities of nutrient zinc to acidic soils and to rock-derived soils limestoned at rational rates.

As shown above, sphalerite is virtually inert when introduced into commercial fertilizers, whereas, subsequent to its incorporation into soils, it undergoes progressive conversion into soluble salts of zinc at concentrations that assure sustained adequate supplies of such nutrients to vegetative growth, while providing economical conservation of that portion of the sphalerite remaining as such.

Thus the prescribed use of sphalerite assures maintenance of a sustained supply of nutrient zinc in the soil. An additional advantage, other than the economy of the flotation mineral, is the capacity of that mineral to supply a concomitant supply of nutrient sulfates in the soil solution, and thereby diminish need for direct supplemental additions of such sulfates.

It should now be apparent that the present invention satisfies the objectives described above.

Changes in or modifications to this invention may now occur to those skilled in the art without departure from the present inventive concept. For example, the sphalerite, in desired amounts, could be added to one or more of the materials to be mixed later with others to form the mixed fertilizer. The inert character of the sphalerite makes it possible to add the sphalerite to any fertilizer material without fear of either chemical or physical effect. When raw rock phosphate is employed as the fertilizer or as a component of the final fertilizer mix, the sphalerite may be added directly thereto. When the rock phosphate is to be converted into the superphosphate, the sphalerite could be added either prior to or subsequent to acidulation of the raw rock phosphate, because the inert character of the sphalerite is not changed during the step of acidulation of the phosphate, as is evident from the findings embodied in Table III.

Reference should therefore be had to the appended claims to determine the scope of this invention.

What is claimed is:

1. In a process for preventing caking of a mixed fertilizer to be fortified by plant nutritional zinc, the step of adding to the fertilizer nutritional amounts of flotation fines of ground sphalerite of particle size from approximately 10 to 65 mesh.

2. In a process for preventing caking of mixed fertilizers to be fortified by plant nutritional zinc, the step of adding to the fertilizer nutritional amounts of from approximately 2 to 8 percent per ton of fertilizer of flotation fines of sphalerite of particle size from approximately 10 to 65 mesh.

References Cited in the file of this patent
UNITED STATES PATENTS

| | | |
|---|---|---|
| 2,069,710 | Missbach | Feb. 2, 1937 |
| 2,280,451 | Riddle | Apr. 21, 194 |
| 2,683,658 | Saunders | July 13, 195 |

OTHER REFERENCES

Bibliography of the Literature on the Minor Elements abstract of R. M. Barnette's article, "A Study of Chlorosis," page 937, col. 1874, fourth edition, vol. 1, Chilean Nitrate Educational Bureau, 1948.

Bibliography of the Literature of the Minor Elements abstract of J. C. Johnston, "Trials with Zinc-Bearing Dusts," page 952, col. 1904, 4th ed., vol. 1, 1948.